March 17, 1953     J. M. PESTARINI     2,632,140

SPEED CONTROL OF MACHINES

Filed Sept. 23, 1948

INVENTOR

J. M. Pestarini

Patented Mar. 17, 1953

2,632,140

UNITED STATES PATENT OFFICE 2,632,140

SPEED CONTROL OF MACHINES

Joseph Maximus Pestarini, Staten Island, N. Y.

Application September 23, 1948, Serial No. 50,731

6 Claims. (Cl. 318—172)

A rotating machine has generally two fundamental members, one member fixed in the space, referred to as stator and another member rotating in the space, referred to as rotor. It may happen that the rotational speed between rotor and stator is not the desired absolute rotational speed of the shaft. In order to cause the shaft to rotate at the desired absolute rotational speed, one may make the stator rotatable and drive it through an auxiliary machine.

The present invention is relative to a control system allowing the shaft any desired value for its absolute rotational speed, independently from the differential speed between stator and rotor, by controlling the speed of the auxiliary machine driving the stator of the main machine.

The control system of the present invention consists essentially of a regulator dynamo mechanically coupled to the shaft and able to supply a current, referred to as regulator current, varying very quickly for small speed variations from the desired value and, after amplification, traversing an auxiliary dynamo which in its turn drives the stator of the main machine.

The value of the absolute speed of the shaft may be set, according to this invention, by varying the resistance of the circuit in which the field winding of the regulator dynamo is inserted.

A description of embodiments of the invention is hereinafter given, reference being made to the accompanying drawings.

Figure 1:
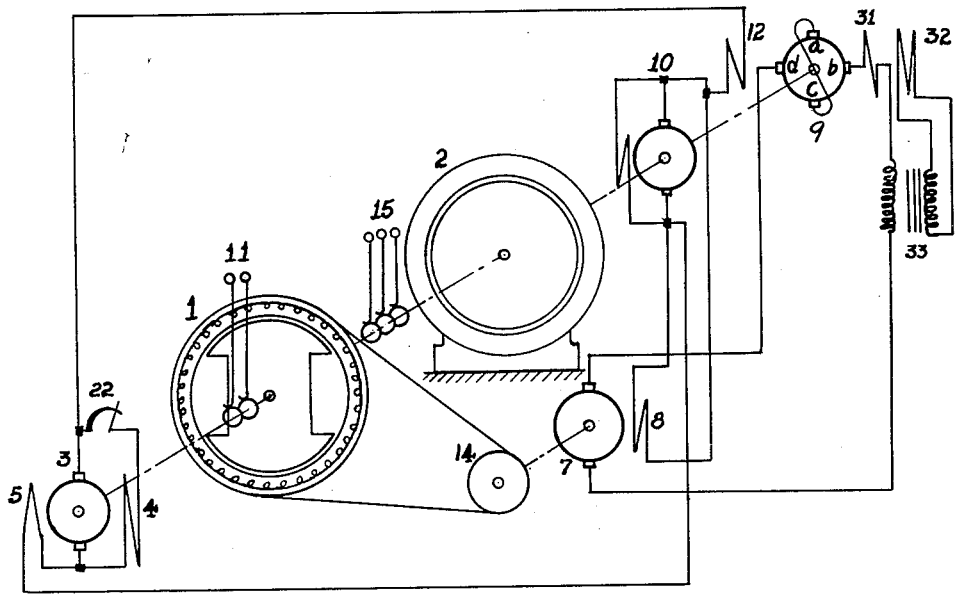
Figure 2:
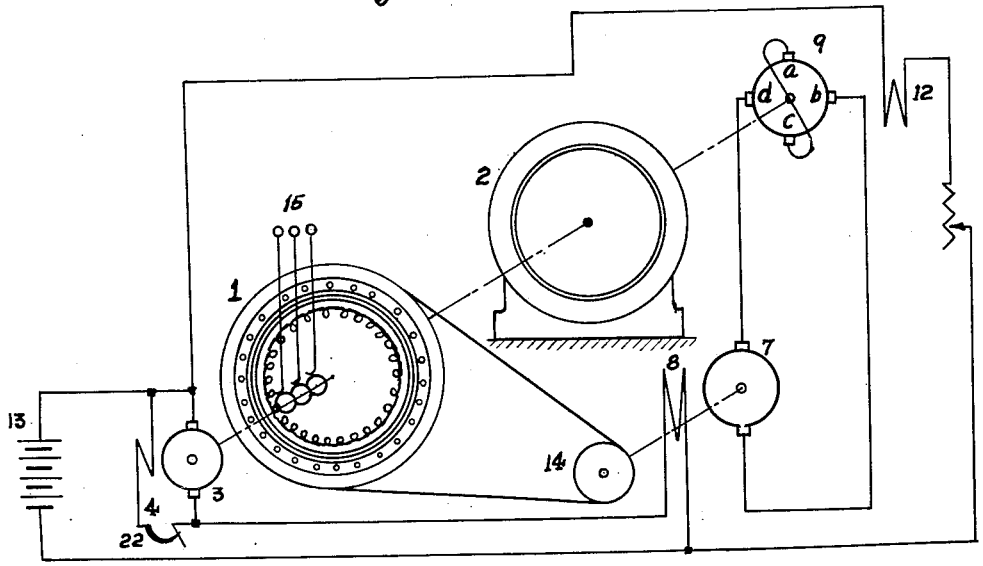
Figure 3:
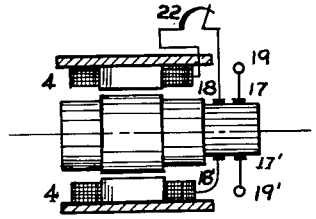

Figure 1 represents a synchronous machine including a pair of rotatable members mechanically coupled to another machine including a single rotatable member, the latter rotating at a speed different from the difference of speed between rotatable members of the synchronous machine; Figure 2 shows a similar system, including an asynchronous motor provided with a squirrel cage; Figure 3 shows details of the regulator dynamo which forms a part of the systems shown in Figures 1 and 2.

In Figure 1, a main synchronous machine 1 is indicated as having a field inductor as a member coupled to a rotatable shaft and a rotatable armature provided with polyphase windings. The exciting current for the inductor is carried through sliprings 11 and three phase current is carried to the armature by means of sliprings 15. The armature of the synchronous machine 1 is driven by the auxiliary dynamo 7 through a pulley 14 and a belt. The transmission of the torque from the auxiliary driving dynamo 7 to the armature of the synchronous machine 1 is shown on the figure as a belt transmission in order to simplify the drawing but said transmission may be performed by any other means, for instance, by a toothed gear or by a direct coupling of the armature of machine 1 to the armature of machine 7.

Thus, the main machine 2 has its rotor rotating at an absolute speed which is the algebraic sum of the rotational speed between armature and field inductor of machine 1 defined by the frequency of the current input and the rotational speed of the armature of said machine 1.

A regulator dynamo 3 is mechanically coupled to the shaft of the machines 1, 2. The regulator dynamo 3 has a main field winding 4 shunt connected across its brushes and its armature is connected to a direct current source, a dynamo 10, driven by the same shaft.

The regulator dynamo 3 is adapted to rotate at a critical speed. Such speed may be defined as that speed at which the resistance of the excitation circuit including the field winding 4, is equal to the ratio of the electromotive force induced by the armature of the dynamo 3 to the intensity of the exciting current traversing said excitation circuit, the iron of the magnetic circuit of the regulator dynamo being completely unsaturated. It is understood that the critical speed may be predetermined by suitably adjusting the resistance of the excitation circuit. At its critical speed, the regulator dynamo will supply or absorb a current which varies very quickly for even slight departures from the desired value of the speed of the shaft.

The regulator dynamo and its action has been described in many previous patents by the same applicant, see for instance, the U. S. Patent 1,962,030, patented June 1934, entitled "Rotary Transformer for Electric Direct Currents." Its main excitation may be a shunt excitation or a series excitation.

The current supplied or absorbed by the regulator dynamo, referred to as regulator current, traverses the variator winding 12 of an amplifying metadyne 9 supplying, through its secondary brushes b and d, current to the armature of the auxiliary dynamo 7.

The regulator current of even very small intensity is amplified through the amplifier metadyne 9 to any desired value so that the amplifier metadyne 9 may supply the auxiliary dynamo 7 with the necessary current for developing a sufficient torque for driving the armature of the machine 1.

The amplifying metadyne has been many times described in previous U. S. patents by the same applicant, for instance, the United States Patent 2,112,604, patented March 29, 1938, entitled "Direct Current Electrical Generator."

As shown in Fig. 1, the metadyne may include an anti-hunting member of the secondary variator winding 32 energized by a transformer 33, the primary of which is inserted into the armature circuit of the auxiliary driving dynamo 7 as explained in the United States Patent by the same applicant, 2,203,544 of June 4, 1940, entitled "Power Systems." Similarly, the figure indicates the secondary compensating or better hypo-compensating winding 31, the action of which is clearly explained in the British Patent, 420,167 patented November 27, 1934, entitled "Improvements in Direct Current Dynamo Electric Machines," by the same author.

The auxiliary driving dynamo 7 is shown independently excited through the field winding 8, by the direct current source 10, a shunt excited dynamo preferably with a saturated magnetic circuit.

The slightest discrepancy of the absolute speed of the shaft of the main machines from the desired value, causes the creation of a regulator current which is amplified and traverses the auxiliary driving dynamo at a speed compensating the said discrepancy and causing the absolute speed of the shaft of the main machine to keep very closely to the desired value.

In many applications it is desirable to modify the absolute speed of the shaft. According to this invention, this is obtained by modifying the resistance of the resistor 22 inserted in the circuit of the main excitation winding 14 of the regulator dynamo 3.

In order to increase the sensitiveness of the regulator dynamo 3 to the speed variations of its shaft, an auxiliary series connected excitation winding 5 may be provided for compensating a part of the ohmic drop in the external circuit of the regulator dynamo.

A further improvement of the regulator dynamo is schematically indicated in Fig. 3, where a pair of main brushes 17, 17' on the armature, transmits the main current absorbed or supplied by the regulator dynamo to the main terminals 19 and 19'. A pair of auxiliary brushes 18 and 18' on the armature are connected to the shunt field excitation winding 4. This arrangement allows for the field shunt excitation current to be independent from the variable brush voltage drop that occurs under the main brushes 17 and 17'. The setting resistor 22 is indicated as inserted in the circuit of the shunt field excitation.

The direct current source 10 and the amplifier metadyne 9 are indicated on Figure 1 as mechanically coupled to the shaft of the main machines 1 and 2. They may be driven by any other means, preferably at a substantially constant speed.

In Figure 2, another example is shown with the main machine 1 being an asynchronous, three phase machine with a squirrel cage as a secondary winding. Similar elements of the schemes of Figures 1 and 2 are indicated by the same numerals. The primary three phase winding is indicated as disposed on the rotatable member mounted on the shaft. The current is supplied to said winding through the sliprings and brushes 15. The other rotatable member includes a squirrel cage and thus it does not need any sliprings.

The regulator dynamo 3 is indicated as shunt excited through its field winding 4 and connected to the battery 13.

The setting rheostat 22 is indicated as inserted in the circuit of the shunt field excitation winding.

The regulator current traverses directly, without amplification, the field winding 8 of the auxiliary driving dynamo 7, which is mechanically coupled to the squirrel cage member of the synchronous motor 1 through a pulley 14 and a belt. The armature of the auxiliary driving dynamo 7 is supplied with current by the metadyne generator 9, the current of which is controlled by the variator winding 12 energized by the battery 13, through an adjustable resistor in series therewith.

The torque of the auxiliary dynamo 7 may be regulated either by regulating the armature current as indicated by Figure 1 or by regulating the excitation current as indicated by Figure 2.

In the examples given above, the regulator dynamo has been indicated as shunt excited but any other kind of regulator dynamos as described in the previous patents by the same author may be used, for instance, a dynamo having its main field winding a series winding.

As various possible embodiments might be made of the above described invention, and as various changes might be made in the embodiments set forth, it is understood that all matter herein set forth or shown in the accompanying drawing, is to be interpreted as illustrative and not in a limiting sense.

I claim:

1. In a power system comprising a motor consisting of two members rotatable about a common axis, said members having a predetermined relative rotational speed, means for coupling one of said members to a power shaft, a speed regulator dynamo rotatable at a critical speed set, and including a shunt field winding operative to self excite said dynamo at said critical speed, an auxiliary dynamo including a field winding and an amplifier metadyne including a control winding, means for coupling said regulator dynamo to said power shaft, means for coupling said auxiliary dynamo to the other of said rotatable member, means for energizing said control winding with a substantially constant current, said auxiliary dynamo being connected in circuit with said amplifier metadyne, the field winding of said auxiliary dynamo being connected in circuit with said regulator dynamo, whereby said power shaft rotates at a speed proportional to the operational speed of the regulator dynamo, and means for controlling the critical speed of the regulator dynamo including a variable resistance in the field exciting circuit of said regulator dynamo.

2. In a power system as in claim 1, wherein the armature of said regulator dynamo comprises two sets of brushes, one set of brushes being connected in circuit with the shunt field winding of said regulator dynamo and the other set of brushes being connected in circuit with the control winding of said metadyne, said regulator dynamo being further provided with a series field winding for substantially compensating the ohmic drop in the external circuit.

3. In a power system comprising a motor consisting of a pair of rotatable members rotatable about a common axis and creating rotating magnetic fields having a predetermined relative rotational speed, a speed regulator dynamo coupled to one of said members, said dynamo including a field winding, said dynamo being adapted to rotate at a constant critical speed and said winding being operative to self excite said dynamo at said critical speed, an auxiliary dynamo coupled to the other of said members, an amplifier metadyne including a control winding, said control winding being in circuit with said regulator dynamo, said metadyne being in circuit with said auxiliary dynamo, whereby a deviation in rotational speed of one rotatable member from said critical speed will cause said regulator dynamo to be traversed by a regulator current operative to energize said auxiliary dynamo and rotate the same at a speed whereby the other rotatable member coupled thereto will rotate at a speed which will restore the speed of said one rotatable member to said critical speed.

4. In a power system, as set forth in claim 3, and further including means for regulating the critical speed of said regulator dynamo.

5. In a power system, as set forth in claim 3, and further including a source of alternating polyphase current for energizing said motor, wherein the relative rotational speed of said rotating magnetic fields is defined by the frequency of said source of polyphase current.

6. In a power system comprising a motor having a pair of rotatable, coaxial members, a metadyne coupled to one of said members and including a control winding, an independently excited dynamo coupled to the other of said members, a speed regulator dynamo operative at its critical speed coupled to one of said members for supplying a control current to said control winding, the output of said metadyne being connected to said independently excited dynamo, whereby the last mentioned member rotates at a constant speed of predetermined value independently of the relative speed of said members.

JOSEPH MAXIMUS PESTARINI.

REFERENCES CITED

The following references are of record in the file of this patent:

UNITED STATES PATENTS

| Number | Name | Date |
|---|---|---|
| 1,845,770 | Umansky | Feb. 16, 1932 |

FOREIGN PATENTS

| Number | Country | Date |
|---|---|---|
| 4,803 | Great Britain | of 1914 |
| 748,664 | France | Apr. 25, 1933 |